US012613831B2

(12) United States Patent (10) Patent No.: US 12,613,831 B2
Tilbury et al. (45) Date of Patent: Apr. 28, 2026

(54) DATA PRESERVATION

(71) Applicant: Preservica Ltd, Abingdon (GB)

(72) Inventors: Jonathan Tilbury, Abingdon (GB);
Jack O'Sullivan, Abingdon (GB);
Richard Smith, Abingdon (GB);
Philippe Antonietti de Olivera,
Abingdon (GB)

(73) Assignee: PRESERVICA LTD., Abingdon (GB)

( * ) Notice: Subject to any disclaimer, the term of this
patent is extended or adjusted under 35
U.S.C. 154(b) by 0 days.

(21) Appl. No.: 18/447,442

(22) Filed: Aug. 10, 2023

(65) Prior Publication Data

US 2024/0354285 A1 Oct. 24, 2024

(30) Foreign Application Priority Data

Apr. 18, 2023 (GB) ...................................... 2305689

(51) Int. Cl.
G06F 16/11 (2019.01)
(52) U.S. Cl.
CPC .......... G06F 16/122 (2019.01); G06F 16/116
(2019.01)
(58) Field of Classification Search
CPC .. G06F 16/122; G06F 16/116; G06F 16/2308;
G06F 16/258; G06F 16/27
See application file for complete search history.

(56) References Cited

U.S. PATENT DOCUMENTS

| 2008/0072290 A1* | 3/2008 | Metzer ................ G06F 16/2308 |
| | | 726/2 |
| 2020/0026710 A1 | 1/2020 | Przada et al. |
| 2021/0350485 A1 | 11/2021 | Majumdar et al. |

FOREIGN PATENT DOCUMENTS

EP 1852815 A1 11/2007

* cited by examiner

*Primary Examiner* — Tyler J Torgrimson
(74) *Attorney, Agent, or Firm* — Michael Best &
Friedrich LLP

(57) ABSTRACT

A computer-implemented method for automatically preserving data in a data preservation system. The method comprises receiving, by the data preservation system, first data to be preserved, the first data comprising one or more first constituent data. The method further comprises processing, by the data preservation system, each one of the one or more first constituent data to generate second data representing the received first data to be preserved. The second data comprises structured data adhering to a pre-defined data model and one or more second constituent data representing the one or more first constituent data. The method further comprises storing, by the data preservation system, the second data in the data preservation system for later retrieval.

20 Claims, 10 Drawing Sheets

400 — Receive first data to be preserved

402 — Process the first data to generate second data, the second data comprising structured data 404 — Store the second data for later retrieval 500 — Receive first data to be preserved 502 — Identify a format preservation policy 504 — Generate second constituent data in a second file format based on the format preservation policy and first constituent data of the first data 506 — Store the second data for later retrieval 600 — Receive first data to be preserved 602 — Process the first data to generate second data, the second data comprising structured data 604 — Store, for the second data, one or more corresponding unique identifiers, including a structured data unique identifier 606 — Store the second data for later retrieval 700 — Retrieve first data from storage, the first data comprising structured data 702 — Process the first data based on the structured data to generate second data 704 — Output the second data 800 — Retrieve first data from storage, the first data comprising structured data 802 — Identify a format preservation policy 804 — Generate second constituent data in a second file format based on the format preservation policy and first constituent data of the first data 806 — Output the second data

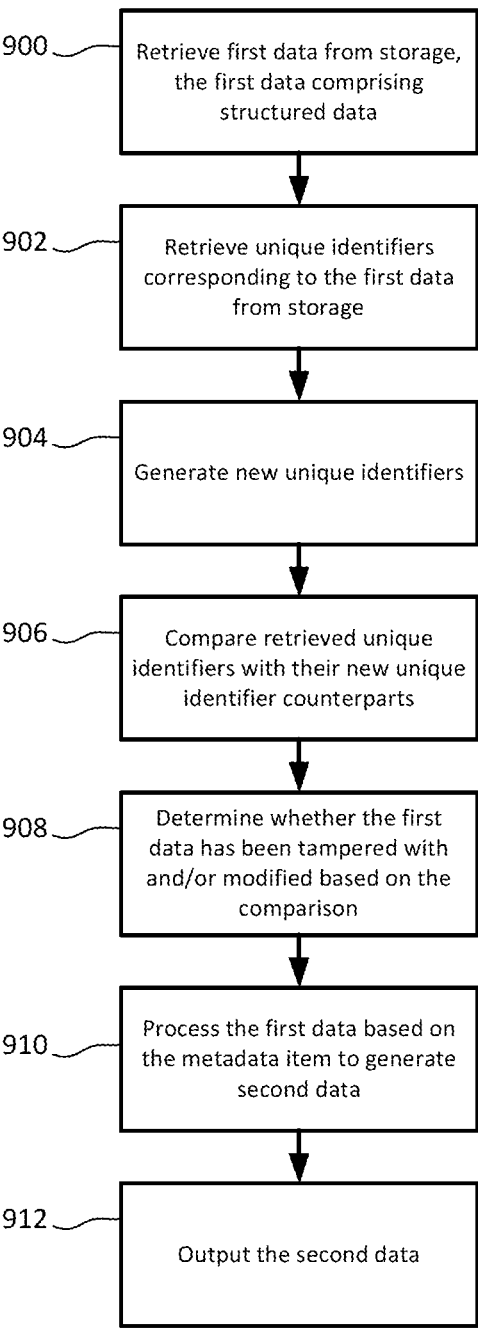

900 — Retrieve first data from storage, the first data comprising structured data 902 — Retrieve unique identifiers corresponding to the first data from storage 904 — Generate new unique identifiers 906 — Compare retrieved unique identifiers with their new unique identifier counterparts 908 — Determine whether the first data has been tampered with and/or modified based on the comparison 910 — Process the first data based on the metadata item to generate second data 912 — Output the second data

Figure 9

DATA PRESERVATION

TECHNICAL FIELD

The following relates to computer-implemented methods for preservation of digital data and in particular to preserving the integrity of digital data stored in a digital preservation system.

BACKGROUND

As recently as 2019 it has been estimated that the majority of the world's data was generated in the preceding two years and that 2.5 quintillion bytes of data is created each day. The overwhelming majority of that data is stored digitally. In addition to the rate of data generation, the environment in which that data is stored is highly dynamic. New file formats are regularly created to encode data (such as the HEIC image format) and existing formats may be updated to improve performance or address faults. Some information requires several digital files to completely and appropriately represent the information contained within. Within this dynamic environment, digital data can become lost or unreadable. Old formats may become unreadable as tools used to create, view or edit those formats become obsolete and fall out of use. Some information may be required for access long after creation, but it is likely that file formats in widespread use at the time of content creation will not be in use at a desired time of access, may be tens or hundreds of years later.

While solutions such as storage and back-up can prevent some hardware related issues such as bit-decay (or bit-rot), the dynamic environment in which digital data is produced, stored and edited means that storage and back-up cannot mitigate all causes of loss of access to digital data. Digital preservation refers to activities performed to ensure continued availability of access to digital data and refers to all of the actions required to maintain access to digital materials beyond the limits of media failure or technological and organisational change.

Digital preservation systems often include elaborate strategies to ensure information is in formats that are appropriate to their use. Such processes are documented in ISO 14721 "Open archival information system (OAIS)—Reference model". However, these strategies currently require significant expert user management. They also do not allow for change to the tools that perform these processes and the information required to determine appropriate actions inevitably changes.

SUMMARY

There is described herein a computer-implemented method of automatically preserving data in a data preservation system. The method comprises receiving, by the data preservation system, first data to be preserved, the first data comprising one or more first constituent data. The method further comprises processing, by the data preservation system, the first data to be preserved to identify first structured data associated with the one or more first constituent data and adhering to a predefined data model. The method further comprises processing, by the data preservation system, the first data to be preserved to generate second data representing the received first data to be preserved. The second data comprises structured data based on the first structured data adhering to a pre-defined data model and one or more second constituent data representing the one or more first constituent data. The method further comprises storing, by the data preservation system, the second data in the data preservation system for later retrieval.

The first structured data may be data that is created at the same time as the first constituent data. Examples of structured data are provided below. The first structured data may be included in a package of data that includes the first constituent data. The first structured data may be received as part of the first data to be preserved together with the first constituent data.

By storing a generating second data including a combination of structured and unstructured data, The processing in the described method may comprise identifying a format preservation policy. The processing in the described method may further comprise generating, for each of the one or more first constituent data, based upon the format preservation policy and a first file format of the first constituent data, corresponding second constituent data in a second file format different that the first file format.

The described method may further comprise storing, for at least one of the one or more second constituent data, a corresponding unique identifier. The described method may further comprise storing, for the structured data, a corresponding unique identifier.

The first data in the described method may be a Microsoft SharePoint List Record, a Microsoft Teams Message, a Microsoft SharePoint Library Record, a Microsoft Exchange Email, or a Lotus Notes Database Record.

The one or more unique identifiers in the described method may be stored separately from the second data.

The format preservation policy in the described method may be configured to receive as input a first file format and provide as output a second file format.

Each one of the one or more unique identifiers in the described method may be provided as output from a data integrity function.

The data integrity function in the described method may be a mathematical function configured to receive as input data indicative of any one of the one or more second constituent data. The data integrity function in the described method may be a mathematical function further configured to generate as output the unique identifier based upon the received input data.

The mathematical function in the described method may be a checksum function.

Each one of the one or more first constituent data and the one or more second constituent data in the described method may comprise an image file, a video file, an audio file, a document file, a geospatial data file, a social media data file, and/or a message file.

The structured data in the described method may comprise name-value pair data.

There is described herein a method for automatically retrieving preserved data from a data preservation system. The method comprises retrieving from storage, by the data preservation system, first data. The first data in the described method comprises structured data adhering to a pre-defined data model. The first data in the described method further comprises one or more first constituent data. The method further comprises processing, by the data preservation system, the first data based upon the structured data to generate second data comprising one or more second constituent data representative of the first data. The method further comprises outputting, by the data preservation system, the second data.

The processing in the described method may comprise identifying a format preservation policy. The processing in the described method may further comprise generating, for each of the one or more first constituent data, based upon the format preservation policy and a first file format of the first constituent data, corresponding second constituent data in a second file format different than the first file format.

The described method may further comprise retrieving from storage, by the data preservation system, one or more unique identifiers each corresponding to a different one of the one or more first constituent data and/or a structured data unique identifier corresponding to the structured data. The described method may further comprise generating, by the data preservation system, for each different one of the one or more first constituent data and/or the structured data, a corresponding new unique identifier. The described method may further comprise comparing, by the data preservation system, for each different one of the one or more first constituent data and/or the structured data, the corresponding unique identifier with the corresponding new unique identifier. The described method may further comprise determining, by the data preservation system, based upon the comparison, whether the first data has been tampered with and/or modified.

The first data in the described method may be a preserved Microsoft SharePoint List Record, a Microsoft Teams Message, a Microsoft SharePoint Library Record, a Microsoft Exchange Email, or a Lotus Notes Database Record.

There is described herein a computing system comprising one or more processors, one or more non-transitory computer-readable media storing computer-readable instructions. The computer-readable instructions are configured to cause one or more processors to receive first data to be preserved, the first data comprising one or more first constituent data. The computer-readable instructions are further configured to cause one or more processors to process each one of the one or more first constituent data to generate second data representing the first data to be preserved. The second data comprises structured data adhering to a pre-defined data model. The second data further comprises one or more second constituent data representing the one or more first constituent data. The computer-readable instructions are further configured to cause one or more processors to store the second data for later retrieval.

The processing in the described computing system may comprise identifying a format preservation policy. The processing in the described computing system may further comprise generating, for each one of the one or more first constituent data, based upon the format preservation policy and a first file format of the first constituent data, corresponding second constituent data in a second file format different than the first file format.

The computer-readable instructions in the described computing system may be configured to cause one or more processors to store, for at least one of the one or more second constituent data, a corresponding unique identifier. The computer-readable instructions in the described computing system may be further configured to cause one or more processors to store, for the structured data, a corresponding unique identifier.

The first data in the described computing system may be a Microsoft SharePoint List Record, a Microsoft Teams Message, a Microsoft SharePoint Library Record, a Microsoft Exchange Email, or a Lotus Notes Database Record.

The one or more unique identifiers in the described computing system may be stored separately from the second data.

BRIEF DESCRIPTION OF THE DRAWINGS

Detailed discussion directed to one of ordinary skill in the art is set forth in the specification, which makes reference to the appended figures, in which:

FIG. 9 is a flow diagram depicting a data retrieval process including a data integrity verification process.

Figure 1:
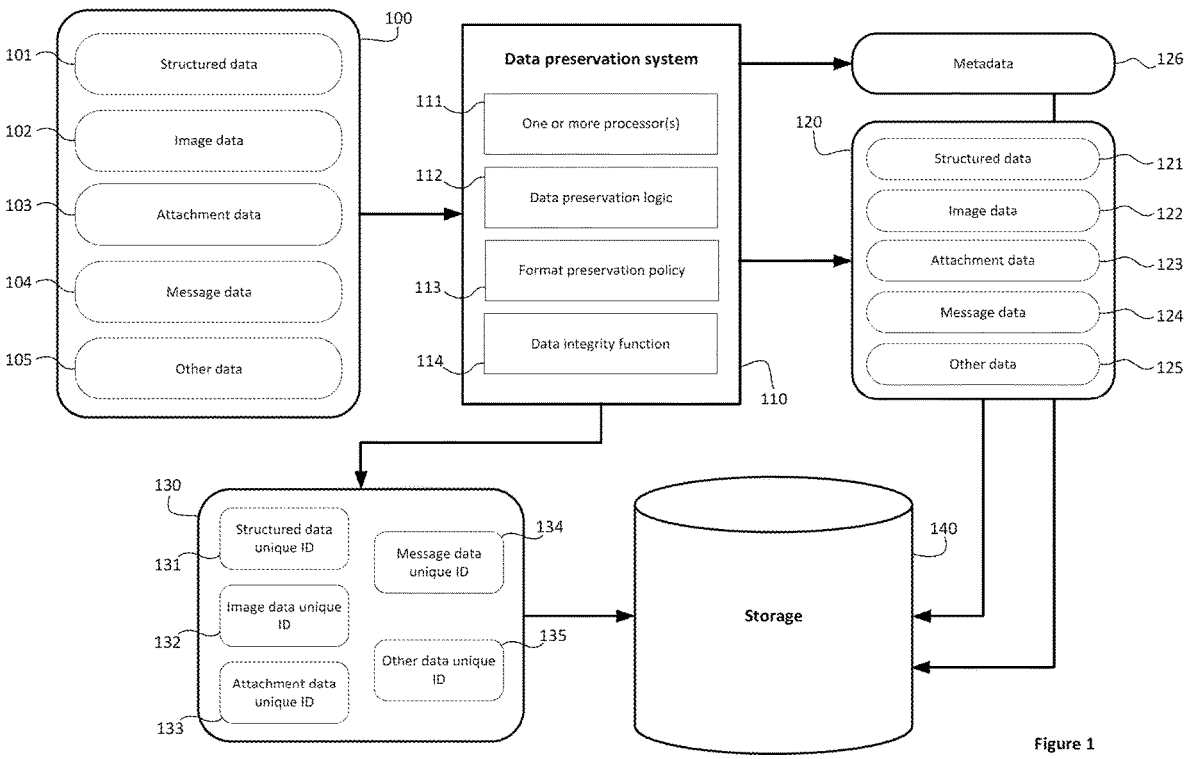
FIG. 1 depicts an example computing system that performs data preservation of a data payload for later retrieval.

Reference numerals that are repeated across plural figures are intended to identify that same features in various implementations.

DETAILED DESCRIPTION

FIG. 1 schematically depicts an example system in which techniques described herein may be implemented. In particular, techniques described herein may be used for the preservation (e.g. storage) of data for retrieval at a later point in time. In FIG. 1, a first data payload 100 may include data that a user wishes to preserve, to ensure access to the data at a future time. The data may include structured data that adheres to a pre-defined data model and is often tabular in nature. In present methods of preservation, while the structured data may be stored within a data preservation system, it is stored in metadata and stored separately to the data the user wishes to preserve. In the example system of FIG. 1, a second data payload 120 and metadata 126 may be generated. The second data payload 120 comprises structured data 121, in addition to other data that the user wishes to preserve. The metadata 126 may include some or all of the data in the structured data 121. More generally, metadata 126 may include any data that may be used for search and/or querying the storage 140. The metadata 126 may be stored separately from the second data payload 120. As will become readily apparent, storage of data in accordance with the methods and systems described herein provides a more robust preservation system that can assure access to data in the future.

The first data payload 100 comprises one or more individual data. For example, the individual data items may be the structured data 101, image data 102, attachment data 103, message data 104, and/or other data 105. The structured data 101 may comprise data indicative of a structure and/or contents of the first data payload 100. Some of the data within the structured data 121 may comprise some or all of the metadata 126. In one example, the structured data 101 may be a. JSON file. The image data 102 may comprise data indicative of an image. In one example, the image data 102 may be a. PNG file or other image format. The attachment data 103 may comprise data indicative of an attachment. In one example, the attachment data 103 may be a .DOCX file or any other document format. The message data 104 may comprise data indicative of a message. In one example, the message data 104 may be a .HTML file or other message data format, such as another mark-up language format, such as XML. The other data 105 may comprise any other data suitable for, and/or compatible with, the systems and methods described herein. In one example, the other data 105 may be a .DAT file. The first data payload 100 may be a container for the one or more individual data. For example, the first data payload 100 may be a .ZIP file containing the one or more individual data. The first data payload 100 may be a collection of the one or more individual data. For example, the first data payload 100 may be a collection of comprising a .JSON file, a .PNG file, a .DOCX file, a .HTML file, and/or a .DAT file.

The first data payload 100 may be one or more files. The first data payload 100 may be one or more structured and/or interrelated files that represent a specific piece of information. In one example, the first data payload 100 may be a Microsoft SharePoint List Record. In one example, the first data payload 100 may be a Microsoft Teams Message. In another example, the first data payload 100 may be a Microsoft SharePoint Library Record. In another example, the first data payload 100 may be a Microsoft Exchange Email. In another example, the first data payload 100 may be a Lotus Notes Database Record. It will be readily understood that the first data payload 100 may be any other data suitable for preservation in accordance with the embodiments described herein.

The first data payload 100 may be provided as input to a data preservation system 110. The first data payload 100 may be provided as input to the data preservation system 110 over a network. For example, the first data payload 100 may be provided to the data preservation system 110 over the internet in accordance with a File Transfer Protocol (FTP), using an Application Programming Interface (API) or any other suitable data transfer protocol. Alternatively, the first data payload 100 and the data preservation system 110 may be present on the same local computer system.

The data preservation system 110 may comprise one or more processor(s) 111, a data preservation logic 112, a format preservation policy 113, and a data integrity function 114. The data preservation system 110 may be implemented on one or more computing devices. In one example, the data preservation system 110 may be implemented on one or more servers.

The data preservation logic 112 may comprise one or more instructions. The one or more instructions may be executed by the one or more processor(s) 111 of the data preservation system 110. The one or more instructions may be implemented in one or more programming languages. By way of example only, the one or more instructions may be implemented in a Java programming language. The data preservation logic 112 may cause the data preservation system 110 to process a first data payload 100 received as input. The data preservation logic 112 may cause the data preservation system 110 to output a second data payload 120. The data preservation logic 112 may also cause the data preservation system 110 to output a metadata 126. The second data payload 120 may be a processed version of the first data payload 100. The data preservation system 110 may output the second data payload 120 and/or the metadata 126 in response to the data preservation system 110 receiving the first data payload 100. The data preservation system 120 may receive the first data payload 100 as input, and output the second data payload 120 and/or the metadata 126 as output. The data preservation system 110 may receive as input one or more first data payloads and output one or more second data payloads and/or one or more metadata 126. That is, the first data payload 100 may be one of a plurality of first data payloads 100, the metadata 126 may be one of a plurality of metadata 126, and the second data payload 120 may be one of a plurality of second data payloads 120.

The second data payload 120 comprises one or more individual data. For example, the individual data may comprise structured data 121, image data 122, attachment data 123, message data 124, and/or other data 125. The structured data 121 may comprise data indicative of a context, structure, and/or semantic meaning of the second data payload 120. The metadata 126 may include some or all of the data in the structured data 121 . . . . In one example, the structured data may be represented as a JSON file. The image data 122 may comprise data indicative of an image. In one example, the image data may be a .PNG file or other image format. The attachment data 123 may comprise data indicative of an attachment. In one example, the attachment data may be a .DOCX file or any other document format. The message data may comprise data indicative of a message. In one example, the message data may be a .HTML file or other message data format, such as another mark-up language format, such as XML. The other data may comprise any other data suitable for, and/or compatible with, the systems and methods described herein. In one example, the other data may be a. DAT file. The second data payload 120 may be a container for at least the one or more individual data. For example, the second data payload 120 may be a .ZIP file containing the one or more individual data. In another example, the second data payload 120 may be stored as a logical collection of individual data objects. The second data payload 120 may be a collection of at least the one or more individual data. For example, the second data payload 120 may be a collection comprising a .JSON file, a .PNG file, a .DOCX file, a .HTML file, and/or a .DAT file. The second data payload 120 may contain or comprise a container containing the one or more individual data. In one example, the container may be a .ZIP file.

The second data payload 120 may further comprise a copy of a metadata 126 in the structured data 121. For example, the metadata 126 may be a subset of the structured data 121. The metadata 126 may comprise data indicative of the one or more individual data. The data indicative of the one or more individual data may be data indicating a state and/or version of the one or more individual data. The metadata 126 may also comprise data indicative of the context, structure, and/or semantic meaning of the data payload 120. The metadata 126 may also comprise data indicative of the data preservation system 110. The data indicative of the data preservation system 110 may comprise data indicating a state and/or version of the data preservation system 110. The state and/or version of the data preservation system 110 may be the state and/or version of the data preservation system 110 at a time at which the data preservation system 110 output the second data payload 120.

The second data payload 120 may be one or more files. The second data payload 120 may be one or more structured and/or interrelated files. In one example, the second data payload 120 may be a Microsoft SharePoint List. In one example, the second data payload 120 may be a preserved copy of a Microsoft Teams Message. In another example, the second data payload 120 may be a preserved copy of a Microsoft SharePoint Library Record. In another example, the second data payload 120 may be a preserved copy of a Microsoft Exchange Email. In another example, the second data payload 120 may be a preserved copy of a Lotus Notes Database Record. It will be readily understood that the second data payload 120 may be any other data suitable for preservation in accordance with the embodiments described herein.

As a result of the second data payload 120 comprising a copy of the metadata 126, important information regarding the context, structure, and/or semantic meaning of the second data payload 120 may be maintained. In particular, the copy of the metadata 126 may provide data indicative of state, version, context, format, and/or structure of the second data payload 120. This indicative data may be used for retrieval of the second data payload 120 at a later point in time, thereby preserving the second data payload 120. Advantageously, because the second data payload 120 comprises the structured data 121, which itself may comprise a copy of the metadata 126 (e.g. the metadata 126 may include some or all of the data in the structured data 121), indicative data provided by the structured data 121 and/or the metadata 126 is protected from being lost, corrupted, modified, and/or tampered with, which may otherwise be the case if stored separately.

The format preservation policy 113 may comprise one or more instructions. The one or more instructions may be executed by the one or more processor(s) 111 of the data preservation system 110. The one or more instructions may be implemented in one or more programming languages. By way of example only, the one or more instructions may be implemented in a Java programming language. The format preservation policy 113 may cause the data preservation system 110 to process one or more individual data in order to transform the one or more individual data from one format to another format. The format preservation policy 113 may, upon causing the data preservation system 110 to transform the one or more individual data from one format to another format, cause the data preservation system 110 to generate a copy of the one or more individual data before transformation. The copy may be included in the second data payload 120. The one or more individual data may be the one or more individual data of the first data payload 100 received at the data preservation system 110. In one example, the transform occurs in response to the first data payload 100 being received as input at the data preservation system 110. In another example, the transform may occur automatically in response to one or more instructions provided by the data preservation logic 112. For example, the data preservation logic 112 may monitor for changes in an operating environment of the data preservation system 110 and provide the transformation accordingly. In one example, the processing of the first data payload 100 by the data preservation system 110 may comprise the transform. The transform may cause a first format of the first data payload 100 to be transformed to a second format. For example, a first data payload having a .DOC file format may be transformed to a .DOCX file format. The data preservation logic 112 may implement the one or more instructions of the format preservation policy 113. The transform may be executed by one of the one or more instructions of the data preservation logic 112.

In this way, the format of one or more individual data may be preserved and/or updated according to the format preservation policy. Advantageously, the preservation and/or transformation of an individual data according to the format preservation policy may cause the one or more individual data to be suitable for retrieval. In other words, retrieval of the one or more individual data may require that a certain file format be used instead of another. For example, a first file format is obsolete, and therefore, a second file format which is more appropriate may be required. As a result, the format preservation policy 113 may conform the one or more individual data to this requirement. Furthermore, such a format preservation policy 113 may provide this conformity before, after, or during the preservation of the data payload 100. Advantageously, the data preservation policy 113 provides contemporaneous and continuous conformity to the required file format, thereby causing the data payload 100 to be suitable for retrieval at a later point in time such that file format requirements are met. Generating a copy of the one or more individual data before transformation provides for data redundancy, the benefits of which will be understood by a person skilled in the art. The generated copy may also be used to validate that the transformation was successful, and/or correct for any deficiencies in the transformation.

The data integrity function 114 may be a function configured to receive as input data and generate as output a unique identifier. The data configured to be received as input by the data integrity function 114 may comprise data indicative of an individual data. The data indicative of the individual data may be the individual data itself and/or data describing and/or representing the individual data. The data received by the data integrity function 114 may be any one of the one or more individual data described with reference to the first data payload 100 and the second data payload 120 of FIG. 1. The data received by the data integrity function 114 may also be the metadata 126. The data may also be a container for the one or more individual data. The data integrity function 114 may be a mathematical function. By way of example, the data integrity function 114 may be a checksum function. The unique identifier may be a hash value representing the individual data. The unique identifier may be unique to the individual data provided as input to the data integrity function 114.

To determine data integrity, a first unique identifier may be compared with a second unique identifier. If the first unique identifier matches the second unique identifier, a first individual data represented by the first unique identifier may be taken to be identical to a second individual data represented by the second unique identifier. If the first unique identifier does not match the second unique identifier, the first individual data represented by the first unique identifier may be taken to be different to the second individual data represented by the second unique identifier. In such cases that a first unique identifier does not match a second unique identifier, this may indicate evidence of tampering and/or modification of an individual data.

The data preservation system 110 may output one or more unique identifiers 130. The output may be a result of one or more individual data being provided as input to the data integrity function 114. The data preservation logic 112 may implement the data integrity function 114.

The one or more unique identifiers 130 may comprise one or more individual unique identifiers. The one or more unique identifiers 130 may each correspond with a respective one of the one or more individual data of the second data payload 120. With respect to FIG. 1, the data preservation system 110 outputs a structured data unique identifier 131, an image data unique identifier 132, an attachment data unique identifier 133, a message data unique identifier 134, and an other data unique identifier 135. In this example, the structured data unique identifier 131 corresponds with the structured data 121, the image data unique identifier 132 corresponds with the image data 122, the attachment data unique identifier 133 corresponds with the attachment data 123, the message data unique identifier 134 corresponds with the message data 124, and the other data unique identifier 135 corresponds with the other data 125.

The data preservation system 110 may store the one or more unique identifiers 130 in a storage 140. Outputting the one or more unique identifiers 130 may include storing the one or more unique identifiers 130 in the storage 140. Advantageously, the use of one or more unique identifiers 130 each corresponding to one of the one or more individual data, allows the preserved data to be later verified against corresponding retrieved data such that an indication as to whether the preserved data was tampered with and/or modified at any point between preservation (e.g. storage) and retrieval. In particular, a result of the structured data unique identifier 121 being stored is that any structured data retrieved with the second data payload 120 may be verified as being the original copy of the structured data 121 As previously discussed, storing the structured data 121 provides a number of advantages, particularly when stored alongside the other individual data of the second data payload 120. In such a way, data integrity verification of the structured data 121 ensures that correct structured data (e.g. metadata) may be used for providing indicative data about the second data payload 120 upon retrieval.

The data preservation system may store the second data payload 120 in the storage 140. Outputting the second data payload 120 may include storing the second data payload 120 in the storage 140.

In one example, the one or more unique identifiers 130 may be stored separately from the second data payload 120 in the storage 140. In this way, tampering and/or modification of the one or more unique identifiers 130 may be prevented, mitigated, and/or protected from tampering and/or modification. Advantageously, tampering and/or modification of the second data payload 120 may be indicated based upon the one or more unique identifiers 130, the one or more unique identifiers 130 themselves being prevented, mitigated, and/or protected from tampering and/or modification based upon the separate storage. Data integrity verification of the one or more unique identifiers 130 upon retrieval may be readily provided for in such an implementation.

The storage 140 may comprise one or more computer-readable storage media.

The storage 140 may be located in one or more locations and/or on one or more computing devices. For example, the storage 140 may be implemented on a first server located in a first geographical location and a second server located in a second geographical location. In another example, the storage 140 may be implemented on one server located in one geographical location. The one or more unique identifiers 130 may be stored separately from the second data payload 120 in the storage 140. The storage 140 may be a storage of the data preservation system 110. The storage 140 may be external to the data preservation system 110. The storage 140 may include a storage of the data preservation system 110 and a storage external to the data preservation system 110. The one or more unique identifiers 130 and the second data payload 120 may be transmitted to the storage 140 over a network.

Figure 2:
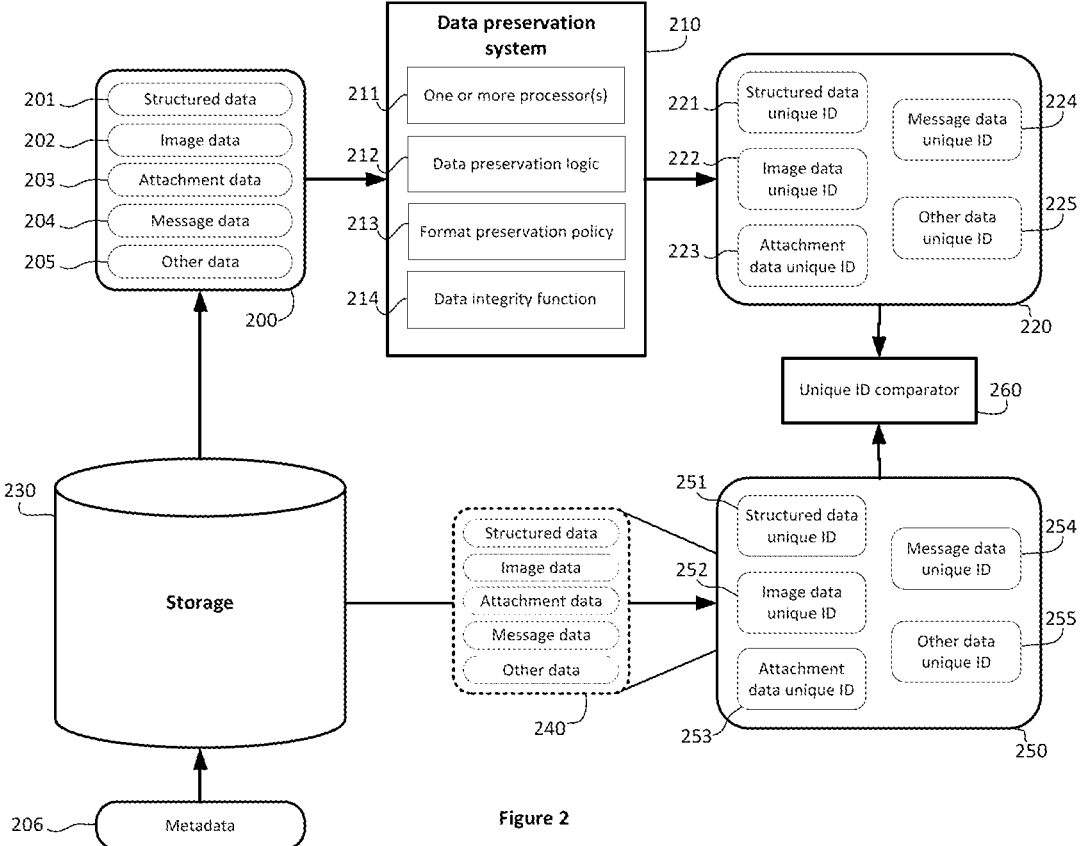
FIG. 2 depicts an example computing system that performs retrieval of a preserved data payload for data integrity verification.

FIG. 2 schematically depicts an example system in which techniques described herein may be implemented. In particular, the example system depicts the retrieval of preserved data and corresponding unique identifiers for the purposes of data integrity verification. For example, a user may wish to retrieve the preserved data (e.g. data that is stored in accordance with the techniques described herein) and verify that the data has not been tampered with and/or modified since the data was stored. A data payload 200 may be data that the user wishes to retrieve. One or more previous unique identifiers 250 may correspond with data that was preserved at a previous point in time. For example, the data that was preserved at a previous point in time may be a previous data payload 240. One or more unique identifiers 220 may correspond with data that was retrieved from storage after the previous point in time. A comparison between the one or more unique identifiers 220 and the one or more previous unique identifiers 250 may indicate whether the preserved data has been tampered with and/or modified. As will become readily apparent, retrieval of data and data integrity verification in the example system of FIG. 2 provides a number of advantages.

The data payload 200 comprises one or more individual data. For example, the individual data may comprise structured data 201, image data 202, attachment data 203, message data 204, or other data 205. The structured data 201 may comprise data indicative of a context, structure, and/or semantic meaning of any data accompanying the structured data 201. The metadata 206 may include some or all of the data in the structured data 201 . . . . In one example, the structured data 201 may be a .JSON file. The image data 202 may comprise data indicative of an image. In one example, the image data 202 may be a .PNG file. The attachment data 203 may comprise data indicative of an attachment. In one example, the attachment data 203 may be a .DOCX file. The message data 204 may comprise data indicative of a message. In one example, the message data 204 may be an .HTML file. The other data 205 may comprise any other data suitable for, and/or compatible with, the systems and methods described herein. In one example, the other data may be a .DAT file. The data payload 200 may be a container for at least the one or more individual data. For example, the data payload 200 may be a .ZIP file containing the one or more individual data. The data payload 200 may be a collection of at least the one or more individual data. For example, the data payload 200 may be a collection of a .JSON file, a .PNG file, a .DOCX file, an .HTML file, and a .DAT file. The data payload 200 may contain or comprise a container 207 containing the one or more individual data. In one example, the container 207 may be a .ZIP file. The data payload 200 may be the second data payload 120 of FIG. 1.

The data payload 200 may be retrieved from a storage 230. The data payload 200 may be retrieved from the storage 230 over a network, or by any other suitable means (e.g. from local storage). The data payload 200 may be retrieved from storage 230 by searching and/or querying for the data payload 200 using the metadata 206. The retrieving may be executed by one or more computing devices. The storage 230 may be one or more computer-readable storage media. The storage 230 may be located in one or more locations and/or on one or more computing devices. For example, the storage 230 may be implemented on a first server located in a first geographical location and a second server located in a second geographical location. In another example, the storage 230 may be implemented on one server located in one geographical location. The one or more unique identifiers 250 may be retrieved separately from the data payload 200 in the storage 230. As previously discussed with reference to FIG. 1, retrieving the one or more unique identifiers 250 separately from the data payload 200 provides a number of advantages. The storage 230 may be a storage of a data preservation system 210. In one example, the data preservation system 210 retrieves the data payload 200 from the storage 230. The storage 230 may be external to the data preservation system 210. The storage 230 may include a storage of the data preservation system 210 and a storage external to the data preservation system 210. The storage 230 may be the storage 140 of FIG. 1.

The one or more previous unique identifiers 250 may correspond with the previous data payload 240. The one or more unique identifiers 250 may comprise one or more individual unique identifiers. In one example, the one or more previous unique identifiers 250 are the one or more previous unique identifiers 130 of FIG. 1. In this example, the one or more previous unique identifiers correspond with the second data payload 120 of FIG. 1. In this example, the second data payload 120 of FIG. 1 may be the previous data payload 240 of FIG. 2. The one or more previous unique identifiers 250 may each correspond with a respective one of one or more individual data of the previous data payload 240. The previous data payload 240 may represent a data payload at a previous point in time. For example, the previous data payload 240 may represent the data payload 200 at a previous point in time. In one example, the one or more previous unique identifiers 250 corresponding with the previous data payload 240 were generated 10 years before the data payload 200 was retrieved from the storage 230.

The one or more previous unique identifiers 250 may be retrieved from the storage 230. The one or more previous unique identifiers 250 may be retrieved from the storage 230 over a network, or any other suitable means (e.g. from local storage). The retrieving may be executed by one or more computing devices. In one example, the data preservation system 210 retrieves the one or more previous unique identifiers 250 from the storage 230.

The data preservation system 210 may comprise one or more processor(s) 211, a data preservation logic 212, a format preservation policy 213, and a data integrity function 214. The data preservation system 210 may be implemented on one or more computing devices. In one example, the data preservation system 210 may be implemented on one or more servers. In one example, the data preservation system 210 may be the data preservation system 110 of FIG. 1.

The data preservation system 210 may be configured to output one or more unique identifiers 220. The one or more unique identifiers may correspond to the data payload 200. The data preservation system 210 may output the one or more unique identifiers 220 in response to the data payload 200 being received as input at the data preservation system 210. The data preservation logic 212 of the data preservation system 210 may instruct the data preservation system 210 to retrieve the data payload 200 from the storage 230. The data preservation logic 212 may instruct the data preservation system 210 to output the one or more unique identifiers 220. The outputting may include storing the one or more unique identifiers 220 in the computer-readable storage medium of the data preservation system 210. The outputting may include transmitting the one or more unique identifiers 220 to one or more computing devices. In one example, the data preservation system 210 outputs the one or more unique identifiers 220 to a unique identifier comparator 260.

The unique identifier comparator 260 may compare the one or more unique identifiers 220 with the one or more previous unique identifiers 250. The comparison may comprise determining whether one or more of the one or more unique identifiers 220 match with a corresponding one of the one or more previous unique identifiers 250. For example, the comparison may involve determining whether structured data unique identifier 221 matches with the previous structured data unique identifier 251. In this example, if the structured data unique identifier 221 matches with the previous structured data unique identifier 251, this may be indicative that a structured data 201 of the data payload 200 has not been tampered and/or altered. Alternatively, if the structured data unique identifier 221 does not match with the previous structured data unique identifier 251, this may be indicative that a structured data 201 of the data payload 200 has been tampered and/or altered. Use of a unique identifier comparator 260 to compare the one or more unique identifiers 220 with the one or more previous unique identifiers 250 thereby provides data integrity verification.

Advantageously, because the data payload 200 comprises the structured data 201, and the one or more unique identifiers 220 are compared with the one or more previous unique identifiers 250 by the unique identifier comparator 260, tampering and/or modification of the structured data 201 may be detectable and/or evident. In one example, the data preservation system 210 may take measures to mitigate the effect of indicated tampering and/or modification of the previous data payload 240 by providing an older backup version of the data payload 200 which has not been tampered and/or modified.

The unique identifier comparator 260 may be implemented by one or more computing devices. The one or more computing devices may be one or more servers located in one or more locations. The unique identifier comparator 260 may be part of the data preservation system 210. The unique identifier comparator 260 may external to the data preservation system 210. The unique identifier comparator 260 may be both part of the data preservation system 210 and part of one or more computing devices external to the data preservation system 210.

With respect to FIG. 2, the data preservation system 210 outputs a structured data unique identifier 221, an image data unique identifier 222, an attachment data unique identifier 223, a message data unique identifier 224, and an other data unique identifier 225. In this example, the structured data unique identifier 221 corresponds with the structured data 201, the image data unique identifier 222 corresponds with the image data 202, the attachment data unique identifier 223 corresponds with the attachment data 203, the message data unique identifier 224 corresponds with the message data 204, and the other data unique identifier 225 corresponds with the other data 205. It will be understood that a unique identifier may be generated for the container 207, the data payload 200, or other relevant data in a manner consistent with the techniques described herein.

The data integrity function 214 may be a function configured to receive as input data and generate as output a unique identifier. The data configured to be received as input by the data integrity function 214 may be data indicative of an individual data. The data indicative of the individual data may be the individual data itself and/or data describing and/or representing the individual data. The data may be any one of the one or more individual data described with reference to FIG. 1 or 2. The data may also be the metadata 206. The data may also be a container for the one or more individual data. The data integrity function 214 may be a mathematical function. In one example, the data integrity function 214 may be a checksum function. In one example, the unique identifier is a hash value representing the individual data. The unique identifier may be unique to the individual data provided as input to the data integrity function. In one example, the one or more unique identifiers 220 and/or the one or more previous unique identifiers 250 are hash values. The data integrity function 214 may be the data integrity function 114 of FIG. 1.

Figure 3:
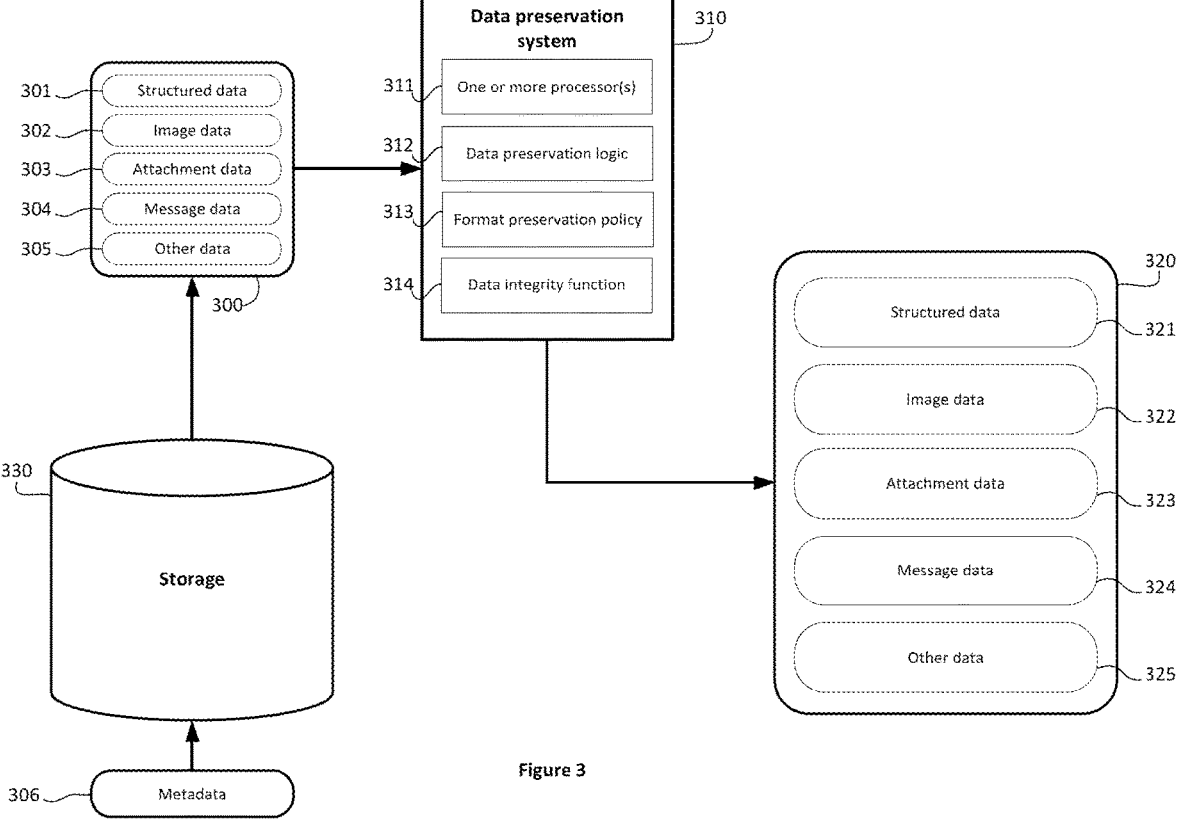
FIG. 3 depicts an example computing system that performs retrieval of a preserved data payload for future use.

FIG. 3 schematically depicts an example system in which techniques described herein may be implemented. In particular, the example system depicts the retrieval of preserved data for the purposes of operable use of the preserved data. For example, a user may wish to retrieve the preserved data (e.g. data that is stored in accordance with the techniques described herein). A data payload 300 may be the data that the user wishes to retrieve. As will become readily apparent, retrieval of data in the example system of FIG. 3 provides a number of advantages, in particular in the context of the example systems in FIGS. 1 and 2 and their description provided herein.

The data payload 300 comprises one or more individual data. For example, the individual data may be structured data 301, image data 302, attachment data 303, message data 304, or other data 305. The structured data 301 may be data indicative of a context, structure, and/or semantic meaning of data accompanying the structured data 301. The structured data 301 may comprise metadata. In one example, the structured data 301 may be a .JSON file. The image data 302 may be data indicative of an image. In one example, the image data may be a .PNG file or other image format. The attachment data 303 may be data indicative of an attachment. In one example, the attachment data may be a .DOCX file or any other document format. The message data 304 may be data indicative of a message. In one example, the message data may be a .HTML file or any other message data format, such as another mark-up language format, such as XML. The other data may comprise any other data suitable for, and/or compatible with, the systems and methods described herein. In one example, the other data may be a .DAT file. The data payload 300 may be a container for at least one of the one or more individual data. For example, the data payload 200 may be a .ZIP file containing the one or more individual data. The data payload 200 may be a collection of at least the one or more individual data. For example, the data payload 200 may be a collection of a .JSON file, a .PNG file, a .DOCX file, a .HTML file, and a .DAT file. The data payload 300 may contain or comprise a container 307 containing the one or more individual data. In one example, the container 207 may be a .ZIP file. The data payload 300 may be the second data payload 120 of FIG. 1 and/or the data payload 200 of FIG. 2.

The data payload 300 further comprises a copy of the metadata 306. For example, the metadata 306 may be a subset of the structured data 301. In other words, the metadata 306 may include some or all of the data in the structured data 301. The metadata 306 may be data indicative of the one or more individual data. The data indicative of the one or more individual data may be data indicating a state and/or version of the one or more individual data. The metadata 306 may also be data indicative of the context, structure, and/or semantic meaning of the one or more individual data. The data indicative of the context, structure, and/or semantic meaning of the data payload 300 may be data indicative of each one of the one or more individual data relative to every other one of the individual data. The metadata 306 may provide data indicative of the context, structure, and/or semantic meaning of the data payload 300 that is required for the data payload 300 to be retrieved and/or used. Furthermore, the data indicative of the context, structure, and/or semantic meaning may enable format transformation of the one or more individual data of the data payload 300, or enable data integrity verification to be performed successfully. The metadata 306 may be used to search and/or query the storage 230 for a data payload (e.g. the data payload 300).

The metadata 306 may also be data indicative of a previous data preservation system. The previous data preservation system may be any one, or combination of, the data preservation system 310, the data preservation system 210 of FIG. 2, the data preservation system 110 of FIG. 1, or any other data preservation system consistent with the data preservation systems described herein. The data indicative of the previous data preservation system may be data indicating a state and/or version of the previous data preservation system. The state and/or version of the previous data preservation system may be the state and/or version of the previous data preservation system at a time in which the previous data preservation system output the data payload 300. In one example, the metadata 306 may be a .XML file.

The metadata 306 may also be data indicative of a previous computing device. A previous computing device may be one or more computing devices that created and/or processed the data that was preserved to form the data payload 300. In one example, the one or more previous computing devices may comprise a computing device which transmitted one or more individual data to a data preservation system (e.g. the data preservation system 100 of FIG. 1) for creation of the data payload 300. The metadata 306 may be the metadata 126 of FIG. 1 and/or the metadata 206 of FIG. 2. In this way, the metadata 126, 206, 306 provides consistent context, structure, and/or semantic meaning of the respective data payload 120, 200, 300 between storage and retrieval, including during data integrity verification and format preservation processes. In the alternative, data payload 120, 200, 300 may not be preserved between storage and retrieval, including during data integrity verification and format preservation processes because of a lack of context, structure, and/or semantic meaning. This may result in the data payload 120, 200, 300 being incompatible with changing system requirements, and/or being incapable of being transformed in accordance with the changing system requirements.

The data payload 300 may be retrieved from a storage 330. The data payload 300 may be retrieved from the storage 330 over a network, or any other suitable means (e.g. from local storage). The data payload 200 may be retrieved from storage 330 by searching and/or querying for the data payload 300 using the metadata 306. The retrieving may be executed by one or more computing devices. The storage 330 may be one or more computer-readable storage media. The storage 330 may be located in one or more locations and/or on one or more computing devices. For example, the storage 330 may be implemented on a first server located in a first geographical location and a second server located in a second geographical location. In another example, the storage 330 may be implemented on one server located in one geographical location. The storage 330 may be a storage of a data preservation system 310. In one example, the data preservation system 310 retrieves the data payload 300 from the storage 330. The storage 330 may be external to the data preservation system 310. The storage 330 may include a storage of the data preservation system 310 and a storage external to the data preservation system 310. The storage 330 may be the storage 140 of FIG. 1 and/or the storage 230 of FIG. 2.

Output data payload 320 comprises one or more individual data. For example, the individual data may be structured data 321, image data 322, attachment data 323, message data 324, or other data 325. The structured data 321 may be data indicative of a context, structure, and/or semantic meaning of a data accompanying the structured data 321. In one example, the structured data 321 may be a .JSON file. The image data 322 may be data indicative of an image. In one example, the image data 322 may be a .PNG file. The attachment data 323 may be data indicative of an attachment. In one example, the attachment data 323 may be a .DOCX file. The message data 324 may be data indicative of a message. In one example, the message data 324 may be a .HTML file. The other data 325 may be any other data suitable for, and/or compatible with, the systems and methods described herein. In one example, the other data 325 may be a .DAT file. The output data payload 320 may be a container for the one or more individual data. For example, the output data payload 320 may be a .ZIP file containing the one or more individual data. The output data payload 320 may be a collection of the one or more individual data. For example, the output data payload 320 may be a collection of a .JSON file, a .PNG file, a .DOCX file, a .HTML file, and a .DAT file. The output data payload 320 may be the second data payload 120 of FIG. 1 and/or the data payload 200 of FIG. 2.

The output data payload 320 may be provided as output from a data preservation system 310. The output data payload 320 may be provided as output from the data preservation system 310 over a network. For example, the output data payload 300 may be provided from the data preservation system 310 over the internet in accordance with a File Transfer Protocol (FTP), Hyper Text Transfer Protocol (HTTP) stream, or any other suitable data transfer protocol. Alternatively, the output data payload 300 and the data preservation system 310 may be present on the same local computer system.

The data preservation system 310 may comprise one or more processor(s) 311, a data preservation logic 312, a format preservation policy 313, and a data integrity function 314. The data preservation system 310 may be implemented on one or more computing devices. In one example, the data preservation system 310 may be implemented on one or more servers. The data preservation system 310 may be the data preservation system 110 of FIG. 1 and/or the data preservation system 210 of FIG. 2.

The data preservation logic 312 may comprise one or more instructions. The one or more instructions may be executed by the one or more processor(s) 311 of the data preservation system 310. The one or more instructions may be implemented in one or more programming languages. By way of example only, the one or more instructions may be implemented in a Java programming language. The data preservation logic 312 may cause the data preservation system 310 to process a first data payload 300 received as input. The data preservation logic 312 may cause the data preservation system 310 to output the output data payload 320. The output data payload 320 may be a processed version of the data payload 300. The data preservation system 310 may output the output data payload 320 in response to the data preservation system 310 receiving the data payload 300. The data preservation system 310 may receive the data payload 300 as input, and output the output data payload 320 as output. The data preservation system 310 may receive as input data payloads and output one or more output data payloads. That is, the data payload may be one of a plurality of data payloads 300. The output data payload may be one of a plurality of output data payloads 320. The data preservation logic 312 may be the data preservation logic 112 of FIG. 1 and/or the data preservation logic 212 of FIG. 2.

The format preservation policy 313 may comprise one or more instructions. The one or more instructions may be executed by the one or more processor(s) 311 of the data preservation system 310. The one or more instructions may be implemented in one or more programming languages. For example, the one or more instructions may be implemented in a Java programming language. The format preservation policy 313 may cause the data preservation system 310 to transform a format of one or more individual data. The format preservation policy 313 may, upon causing the data preservation system 310 to transform the one or more individual data from one format to another format, cause the data preservation system 310 to generate a copy of the one or more individual data before transformation. The copy may be included in the second data payload 120. The one or more individual data may be the one or more individual data of the data payload 300 received at the data preservation system 310. In one example, the transform occurs in response to the data payload 300 being received as input at the data preservation system 310. In one example, the processing of the data payload 300 by the data preservation system 310 may comprise the transform. The transform may cause a first format of the data payload 300 to be transformed to a second format. For example, a data payload having a .DOC file format may be transformed to a .DOCX file format. The data preservation logic 312 may implement the one or more instructions of the format preservation policy 313. The transform may be executed by one of the one or more instructions of the data preservation logic 312. The format preservation policy 313 may be the format preservation policy 113 of FIG. 1 and/or the format preservation policy 213 of FIG. 2.

The data preservation system 310 may process the data payload 300 in accordance with the data preservation logic 312. The data preservation system 310 may process the data payload 300 in accordance with the format preservation policy 313. The data preservation system 310 may process the data payload 300 in accordance with the data integrity function 314.

The data preservation system 310 may use the metadata 306 of the data payload 300 to output the output data payload 320. For example, the metadata 306 may be used to search and/or query the storage 330 for the data payload 300. The one or more individual data of the output data payload 320 may be compatible with a current set of standards and/or versions. The metadata 306 may provide the data preservation system 310 with a context, structure, and/or semantic meaning of the data payload 300. The data preservation system 310 may use the context, structure, and/or semantic meaning of the data payload 300 to output the output data payload 320. The data preservation system 310 may use the context, structure, and/or semantic meaning of the data payload 300 to provide an indication of the context, structure, and/or semantic meaning of the data payload 300. For example, the context, structure, and/or semantic meaning may indicate that at least one of the one or more individual data of the data payload 300 are only compatible with a specific set of standards and/or versions. The data preservation system 310 may output the output data payload 320 in accordance with a current set of standards and/or versions.

Figure 4:
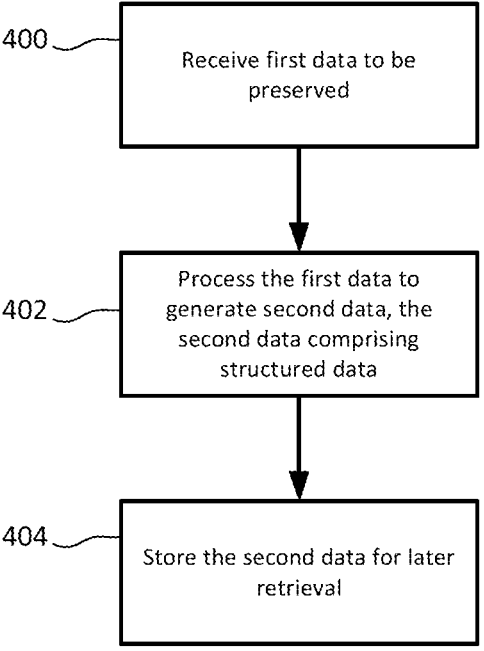
FIG. 4 is a flow diagram depicting a data preservation process including preserving a data payload comprising structured data.

FIG. 4 is an example process that may be applied in order to preserve data for later retrieval.

At step 400, first data to be preserved is received. For example, the first data to be preserved may be received over a network. In another example, the first data to be preserved may be received from local memory. The preservation of the first data may be the storage of the first data in such a way that allows the first data to be retrieved and correctly processed at a later point in time. With reference to FIG. 1, step 400 may be the process of the data preservation system 110 receiving the first data payload 100.

At step 402, the first data is processed to generate second data. The second data comprises structured data. The metadata may be indicative of a context, structure, and/or semantic meaning of the second data. With reference to FIG. 1, step 402 may be the process of the data preservation system 110 processing the first data payload 100 to generate the second data payload 120.

At step 404, the second data is stored for later retrieval in a storage. The storage may be a storage of the data preservation system, or may be a storage located elsewhere. With reference to FIG. 1, step 404 may be the process of the data preservation system 110 storing the second data payload 120 in the storage 140.

Figure 5:
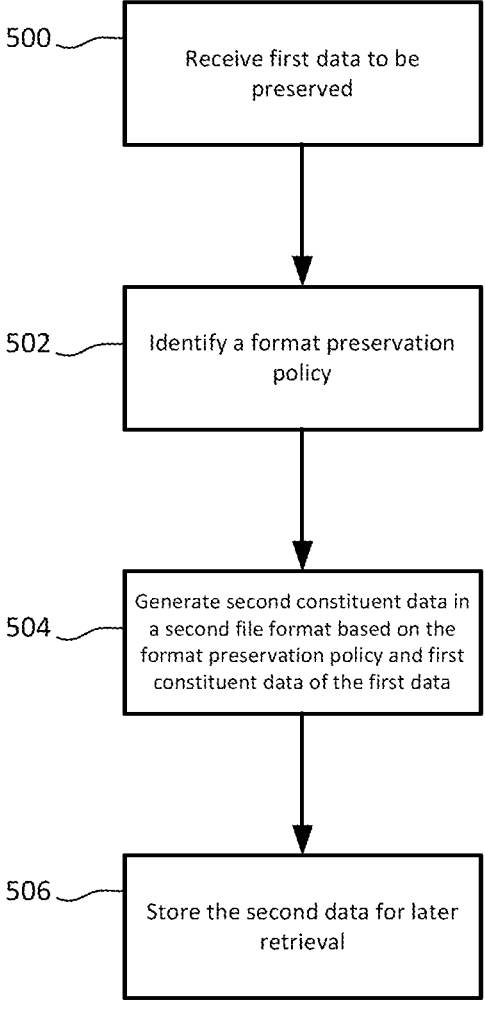
FIG. 5 is a flow diagram depicting a data preservation process including a format preservation process.

FIG. 5 is an example process that may be applied in order ensure second data maintains a format that is suitable for retrieval.

At step 500, first data to be preserved is received. For example, the first data to be preserved may be received over a network. In another example, the first data to be preserved may be received from local memory. The preservation of the first data may be the storage of the first data in such a way that allows the first data to be retrieved at a later point in time. With reference to FIG. 1, step 500 may be the process of the data preservation system 110 receiving the first data payload 100.

At step 502, a format preservation policy is identified. The format preservation policy may specify instructions to transform data having a first file format to a second file format. With reference to FIG. 1, the format preservation policy may be the format preservation policy 113 of the data preservation system 110.

At step 504, the first data is processed to generate second data. The second data comprises structured data. The structured data may be indicative of a context, structure, and/or semantic meaning of the second data. The processing comprises generating, for each of a one or more first constituent data of the first data, a corresponding second constituent data in a second file format, the generating based upon the format preservation policy and a first file format of the first constituent data, the first file format being different than the second file format. With reference to FIG. 1, step 506 may be the process of the data preservation system 110 processing the first data payload 100 to generate the second data payload 120.

At step 506, the second data is stored for later retrieval in a storage. The storage may be a storage of the data preservation system, or may be a storage located elsewhere. With reference to FIG. 1, step 508 may be the process of the data preservation system 110 storing the second data payload 120 in the storage 140.

Figure 6:
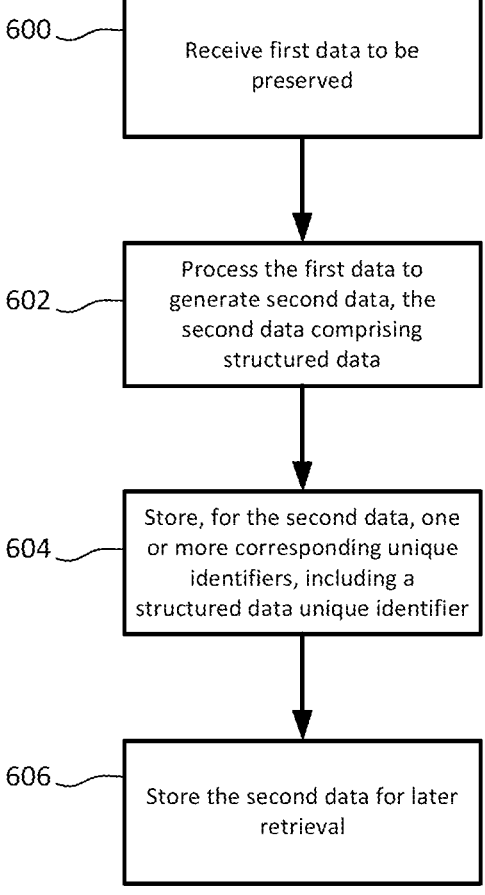
FIG. 6 is a flow diagram depicting a data preservation process including a data integrity verification process.

FIG. 6 is an example process that may be applied in order to enable data integrity verification of second data to be performed at a later point in time.

At step 600, first data to be preserved is received. For example, the first data to be preserved may be received over a network. In another example, the first data to be preserved may be received from local memory. The preservation of the first data may be the storage of the first data in such a way that allows the first data to be retrieved at a later point in time. With reference to FIG. 1, step 600 may be the process of the data preservation system 110 receiving the first data payload 100.

At step 602, the first data is processed to generate second data. The second data comprises structured data. The structured data may be indicative of a context, structure, and/or semantic meaning of the second data. With reference to FIG. 1, step 602 may be the process of the data preservation system 110 processing the first data payload 100 to generate the second data payload 120.

At step 604, for at least one of a one or more second constituent data of the second data, a corresponding unique identifier is stored. Additionally, for the structured data, a corresponding structured data unique identifier is stored. The one or more corresponding unique identifiers and the structured data unique identifier are stored in storage. The storage may be a storage of the data preservation system, or may a storage located elsewhere. With reference to FIG. 1, step 604 may be the process of the one or more unique identifiers 130 being stored in the storage 140.

At step 606, the second data is stored for later retrieval in a storage. The storage may be a storage of the data preservation system, or may be a storage located elsewhere. With reference to FIG. 1, step 606 may be the process of the data preservation system 110 storing the second data payload 120 in the storage 140.

Figure 7:
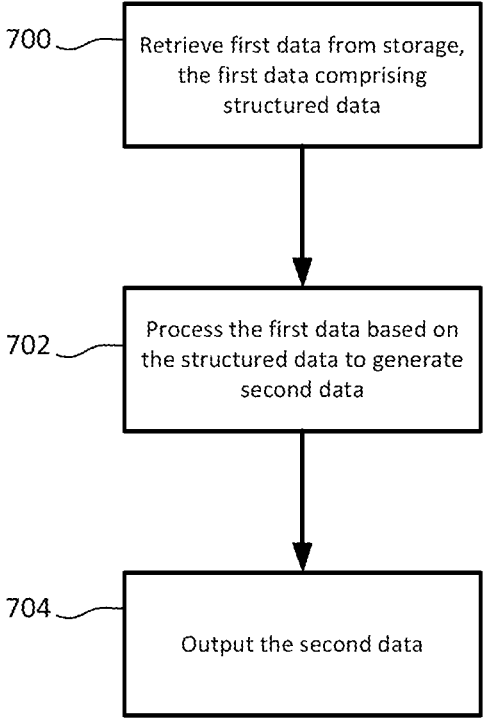
FIG. 7 is a flow diagram depicting a data retrieval process including retrieving preserved data from storage.

FIG. 7 is an example process that may be applied to retrieve preserved (e.g. stored) data.

At step 700, preserved first data is retrieved from a storage. The storage may be a storage of a data preservation system, or may be a storage located elsewhere. For example, the first data may be retrieved over a network. In another example, the first data may be retrieved from local memory. The first data comprises a structured data indicative of a context, structure, and/or semantic meaning of the first data. The retrieval of the first data may be the retrieval of the first data in such a way that enables the context, structure, and/or semantic meaning of the first data to be understood. With reference to FIG. 3, step 700 may be the process of the data preservation system 110 retrieving the data payload 300 from the storage 330.

At step 702, the first data is processed to generate second data. The first data may be processed based on the structured data. The second data may comprise one or more second constituent data representative of the first data. With reference to FIG. 3, step 702 may be the process of the data preservation system 310 processing the data payload 300 to generate the output data payload 320.

At step 704, the second data is output. The second data may be output by the data preservation system. The second data may be output over a network, within local memory, or by any other suitable means. With reference to FIG. 3, step 704 may be the process of outputting the output data payload 320 from the data preservation system 310.

Figure 8:
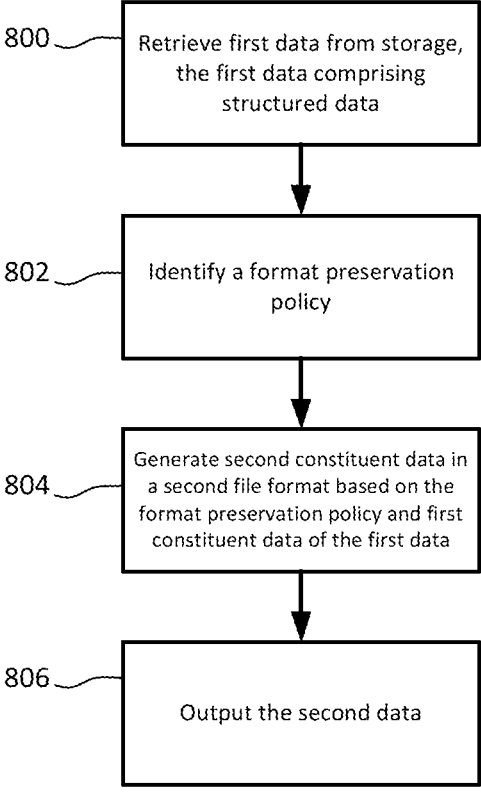
FIG. 8 is a flow diagram depicting a data retrieval process including a format preservation process.

FIG. 8 is an example process that may be applied in order ensure second data maintains a format that is suitable for output.

At step 800, preserved first data is retrieved from a storage. The storage may be a storage of a data preservation system, or may be a storage located elsewhere. For example, the first data may be retrieved over a network. In another example, the first data may be retrieved from local memory. The first data comprises a structured data indicative of a context, structure, and/or semantic meaning of the first data. The retrieval of the first data may be the retrieval of the first data in such a way that enables the context, structure, and/or semantic meaning of the first data to be understood. With reference to FIG. 3, step 800 may be the process of the data preservation system 110 retrieving the data payload 300 from the storage 330.

At step 802, a format preservation policy is identified. The format preservation policy may specify instructions to transform data having a first file format to a second file format. With reference to FIG. 3, the format preservation policy may be the format preservation policy 313 of the data preservation system 310.

At step 804, the first data is processed to generate second data. The first data may be processed based on the structured data. The second data may comprise one or more second constituent data representative of the first data. The processing comprises generating, for each of a one or more first constituent data of the first data, a corresponding second constituent data in a second file format, the generating based upon the format preservation policy and a first file format of the first constituent data, the first file format being different than the second file format. With reference to FIG. 3, step 806 may be the process of the data preservation system 310 processing the data payload 300 to generate the output data payload 320.

At step 806, the second data is output. The second data may be output by the data preservation system. The second data may be output over a network, within local memory, or by any other suitable means. With reference to FIG. 3, step 808 may be the process of outputting the output data payload 320 from the data preservation system 310.

FIG. 9 is an example process that may be applied in order to perform data integrity verification of first data upon retrieval.

At step 900, preserved first data is retrieved from a storage. The storage may be a storage of a data preservation system, or may be a storage located elsewhere. For example, the first data may be retrieved over a network. In another example, the first data may be retrieved from local memory. The first data comprises a structured data indicative of a context, structure, and/or semantic meaning of the first data. The retrieval of the first data may be the retrieval of the first data in such a way that enables the context, structure, and/or semantic meaning of the first data to be understood. With reference to FIG. 2, step 900 may be the process of the data preservation system 210 retrieving the data payload 200 from the storage 230.

At step 902, one or more unique identifiers are retrieved from the storage. One of the one or more unique identifiers may be a structured data identifier corresponding to the structured data. In one example, the one or more unique identifiers may be retrieved over a network. In another example, the one or more unique identifiers may be retrieved from local memory. The one or more unique identifiers may correspond to a previous embodiment of the first data (e.g. the first data at a point in time the first data was stored in the storage). With reference to FIG. 2, step 900 may be the process of the data preservation system 210 retrieving the one or more unique identifiers 250 from the storage 230.

At step 904, for at least one of a one or more first constituent data of the first data, a corresponding new unique identifier is generated. Additionally, for the structured data, a corresponding new structured data unique identifier is generated. With reference to FIG. 2, step 904 may be the process of the data preservation system generating the one or more unique identifiers 220.

At step 906, for each different one of the one or more first constituent data, including the structured data, the corresponding unique identifier is compared with the corresponding new unique identifier. With reference to FIG. 2, step 906 may be the process of the unique identifier comparator 260 comparing the one or more previous unique identifiers 250 with the one or more unique identifiers 220.

At step 908, a determination as to whether the first data has been tampered with and/or modified based upon the comparison in step 906. For example, one of the one or more unique identifiers does not match the respective one of the one or more new unique identifiers, this may indicate that the first data has been tampered with and/or modified.

At step 910, the first data is processed to generate second data. The first data may be processed based on the structured data. The second data may comprise one or more second constituent data representative of the first data. With reference to FIG. 3, step 910 may be the process of the data preservation system 310 processing the data payload 300 to generate the output data payload 320.

At step 912, the second data is output. The second data may be output by the data preservation system. The second data may be output over a network, within local memory, or by any other suitable means. With reference to FIG. 3, step 912 may be the process of outputting the output data payload 320 from the data preservation system 310.

References in the present application to structured data may be understood to be references to data indicative of a context, structure, and/or semantic meaning of a data payload, for example, the first data payload 100 and/or second data payload 120, or indeed any other accompanying data. More generally, structured data is data which adheres to a pre-defined data model. For example, the data model may be a JSON data model or a XML data model. The structured data is often tabular in nature. However, it will be appreciated that the structured data may also be non-tabular data. In one example, the structured data may be a set of name-value pairs. In one example, structured data may be a .JSON file or a .XML file. Some examples of name-value pairs in the context of structured data may be: Customer name: Bob, Customer number: 180732, Order amount: £73, Opt-in: Yes, Order date: Jun. 6, 1932, Username: Bob123, URL: https://www.foobar.com, Location: 13° 31'N 144°50'E, Extras: [1, 2, 3], Image: .PNG image file. In other examples, for example in Microsoft Exchange messages, structured data may include information such as servers from which data originates, retention label information, etc., Such context, structure, and/or semantic meaning may be necessary to interpret the content of unstructured data, and/or any accompanying data, whether that be by computers or humans. For example, a semantic meaning of data may be lost if it weren't for structured data used to interpret it.

References in the present application to unstructured data may be understood to be references to data not indicative of a context, structure, and/or semantic meaning of a data payload, for example, the first data payload 100 and/or second data payload 120, or indeed any other accompanying data. More generally, unstructured data is data that does not follow a pre-defined data model and/or a predictable structure. Examples of unstructured data may be an image file, a video file, an audio file, a document file, a geospatial data file, a social media data file, and/or a message file. In one example, the unstructured data may be an array of pixel values. In one example, unstructured data may be a .PNG file or a .WAV audio file. Unstructured data may be characterised by its inability to be easily searched and/or queried. This may be due to its unstructured nature. With reference to FIG. 1, examples of the unstructured data may be the image data 102, the attachment data 103, the message data 104, and/or the other data 105.

Attachment data may be data which is provided as an attachment. For example, in the case of a Microsoft Teams message, attachment data may be a file which a user attached to the message. The attachment data may be structured data or unstructured data. For example, a user may attach a .JSON file and a .PNG file to a message.

Metadata may be data that can be used to search and/or query a preserved data payload. Metadata may also be data that provides contextual information and/or structure to data. For example, the metadata may correspond with a preserved data payload, and may be stored separately from the preserved data payload. When a search and/or query is made, the metadata may be used to return the corresponding preserved data payload. In another example, the metadata may be used to provide information regarding the origin of data. It may be the case that the metadata used to search and/or query the preserved data payload may only be suitable for search and/or querying if the metadata is not stored within the data payload itself, for example if the search operation does not have access to the contents of the data payload itself. Further, search speed and/or efficiency may be improved by storing the metadata separately from the data payload thereby reducing the need to extract the metadata from the data payload. In one example, a subset of the structured data (e.g. the metadata) may be stored externally to the data payload. In other words, the metadata may include some or all of the data in the structured data. In another example, the subset of the structured data may be specific data in the structured data. The subset of the structured data may be used by the data preservation system for search and/or querying for the data payload. For the reasons described herein, it is desirable to maintain important metadata within the structured data inside the data payload itself during preservation. In such a way, providing a subset of the structured data stored externally to the data payload provides for search and/or query of the data payload, while still ensuring that a complete data payload is maintained.

References in the present application to a pre-defined data model may be understood as referring to a structure or format for organizing and/or storing data. The pre-defined data model may serve a specific purpose or function. For example, the pre-defined data model may be a hierarchical model representing data in a tree-like structure defined by parent-child relationships between individual data elements. Examples of hierarchical data models may be a JSON data model and a XML data model. In one example, the pre-defined data model may be a relational model representing data in the form of tables and/or relations. In another example, the pre-defined data model may be an object-oriented model representing data as objects which have properties and/or methods. In another example, the pre-defined data model may be a graph model representing data in a graph-like structure defined by individual entities and edges, the edges defining relationships between the entities.

Figure 10:
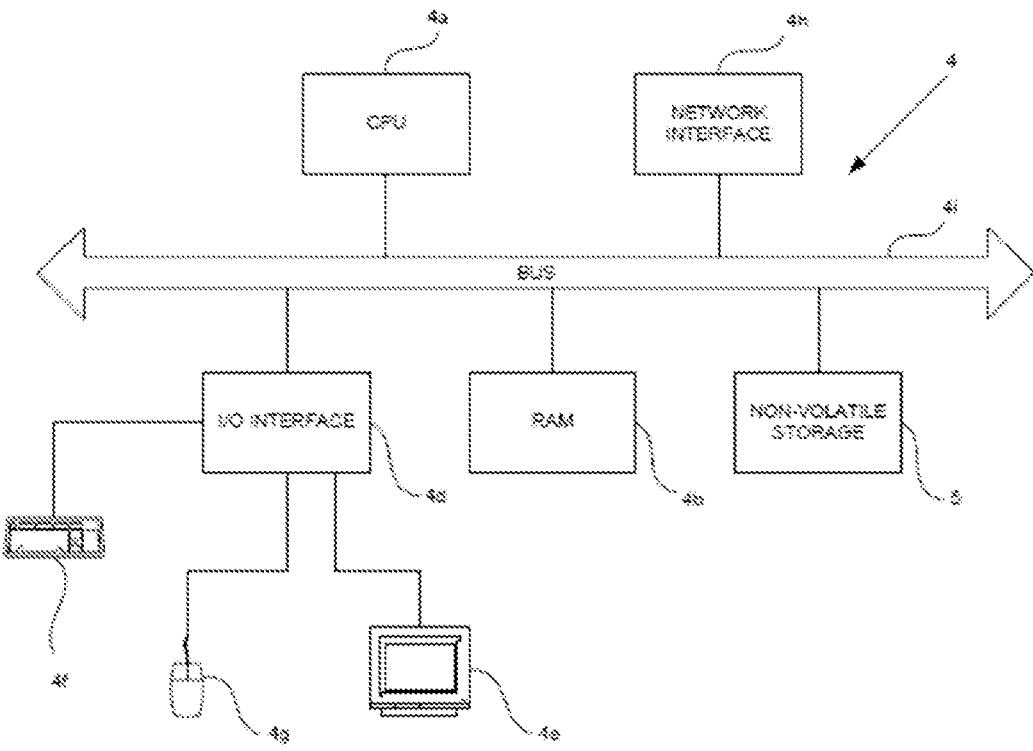
FIG. 10 is a schematic illustration of an exemplary computer system on which aspects described herein may be implemented.

FIG. 10 schematically illustrates an exemplary arrangement of components which may provide a computing system 4 used to implement all or part of the preservation system 100 or a computing device of a user 102-106.

A processor, in this case in the form of a CPU 4a, configured to read and execute instructions stored in a volatile memory 4b which takes the form of a random access memory. The processor 4a may be one of one or more processors 112. It will be appreciated that the processor may take other forms, such as, for example, a GPU. The volatile memory 4b stores instructions for execution by the CPU 4a and data used by those instructions. For example, the instructions may include instructions for causing the preservation system 100 to carry out the processing described above with reference to any of FIGS. 3 to 7.

The computing system 4 comprises a storage device 5. It will be appreciated that the storage device 5 may be implemented in any way, such as for example, a hard disk drive, a solid state drive, etc. The storage device 5 may provide the storage 110. The computing system 4 further comprises an I/O interface 4d to which are connected peripheral devices used in connection with the computing system. More particularly, a display 4e is configured so as to display output. Input devices are also connected to the I/O interface 4d. Such input devices include a keyboard 4f and a mouse 4g which allow user interaction with the computing system 4. A network interface 4h allows the computing system 4 to be connected to appropriate computer networks, such as the Internet 6, and so as to be able to send and receive from and to other computing devices such as computing devices of the users 102-106 (where the computing system 4 provides the preservation system 100) or to the preservation system 100 (where the computing system 4 provides a user device). The network interface 4h may provide the network interface 114. The CPU 4a, volatile memory 4b, the storage device 5, I/O interface 4d, and network interface 4h, are connected together by a bus 4i.

The techniques described above may be implemented in hardware, firmware, software, or any combination thereof. The techniques may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. and in doing that may cause actuators or other devices to interact with the physical world.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the spirit of the invention.

The invention claimed is:

1. A computer-implemented method for automatically preserving digital data in a digital data preservation system to ensure integrity of the digital data over time, comprising at one or more computing devices:

receiving, by the digital data preservation system, a first digital data payload to be preserved, wherein the first digital data payload comprises one or more first constituent data;

processing, by the digital data preservation system, the first digital data payload to be preserved to identify first metadata associated with the one or more first constituent data and adhering to a pre-defined data model;

processing, by the digital data preservation system, the first digital data payload to be preserved to generate a second digital data payload representing the received first digital data payload to be preserved, wherein the second digital data payload comprises:

second metadata based on the first metadata adhering to the pre-defined data model; and one or more second constituent data representing the one or more first constituent data;

generating, using a data integrity function, a unique identifier corresponding to the second metadata of the second digital data payload;

storing, at a first point in time, by the digital data preservation system:

the second digital data payload in the digital data preservation system for later retrieval; and the unique identifier corresponding to the second metadata of the second digital data payload;

retrieving, at a second point in time following the first point in time, from the digital data preservation system:

the second digital data payload; and the unique identifier corresponding to the second metadata of the second digital data payload;

generating, using the data integrity function, a new unique identifier corresponding to the second metadata retrieved from the digital data preservation system at the second point in time;

verifying, by the digital data preservation system, that the second metadata has not been tampered with and/or modified by comparing the unique identifier with the new unique identifier; and outputting, from the digital data preservation system, the second digital data payload to a computer system for use.

2. The computer-implemented method of claim 1, wherein the processing the second digital data payload comprises:

identifying a format preservation policy; and generating, for each of the one or more first constituent data, based upon the format preservation policy and a first file format of the first constituent data, corresponding second constituent data in a second file format different than the first file format.

3. The computer-implemented method of claim 2, wherein the format preservation policy is configured to receive as input a first file format and provide as output a second file format.

4. The computer-implemented method of claim 1, further comprising:

storing, for at least one of the one or more second constituent data, a corresponding first unique identifier.

5. The computer-implemented method of claim 4, wherein each of the unique identifiers are stored separately from the second digital data payload.

6. The computer-implemented method of claim 1, wherein the first digital data payload is a Microsoft SharePoint List Record, a Microsoft Teams Message, a Microsoft SharePoint Library Record, a Microsoft Exchange Email, or a Lotus Notes Database Record.

7. The computer-implemented method of claim 1, wherein the data integrity function is a mathematical function is configured to:

receive input data; and generate as output a respective unique identifier based upon the received input data.

8. The computer-implemented method of claim 7, wherein the mathematical function is a checksum function.

9. The computer-implemented method of claim 1, wherein each of the one or more first constituent data and the one or more second constituent data comprise:

an image file, a video file, an audio file, a document file, a geospatial data file, a social media data file, and/or a message file.

10. The computer-implemented method of claim 1, wherein first and/or second metadata comprises name-value pair data.

11. The computer-implemented method of claim 1, wherein:

the first point in time is associated with a first set of standards and/or versions and the second point in time is associated with a second set of standards and/or versions different from the first set; and the computer-implemented method further comprises:

processing, by the digital data preservation system, the second digital data payload based upon the second metadata to generate an output digital data payload comprising constituent data that is compatible with the second set of standards and/or versions; and outputting, from the digital data preservation system, the output digital data payload to a computer system for use in accordance with the second set of standards and/or versions.

12. A computer-implemented method for automatically retrieving preserved data from a digital data preservation system to ensure integrity of the digital data over time, the method comprising at one or more computing devices:

retrieving from storage, by the digital data preservation system, a first digital data payload, the first digital data payload comprising:

first metadata adhering to a pre-defined data model; and one or more first constituent data;

retrieving from storage, by the digital data preservation system, a unique identifier corresponding to the first metadata generated using a data integrity function;

processing, by the digital data preservation system, the first digital data payload based upon the first metadata to generate a second digital data payload comprising one or more second constituent data representative of the first digital data payload;

generating, using the data integrity function, a new unique identifier corresponding to the first metadata retrieved from the digital data preservation system;

verifying, by the digital data preservation system, that the first metadata has not been tampered with and/or modified by comparing the unique identifier with the new unique identifier; and outputting, from the digital data preservation system, the second digital data payload to a computer system for use.

13. The computer-implemented method of claim 12, wherein processing the first digital data payload comprises:

identifying a format preservation policy; and generating, for each of the one or more first constituent data, based upon the format preservation policy and a first file format of the first constituent data, corresponding second constituent data in a second file format different than the first file format.

14. The computer-implemented method of claim 12, wherein the first digital data payload is a preserved Microsoft SharePoint List Record, a Microsoft Teams Message, a Microsoft SharePoint Library Record, a Microsoft Exchange Email, or a Lotus Notes Database Record.

15. The computer-implemented method of claim 12, wherein:

the first digital data payload is retrieved from the storage at a point in time associated with a present set of standards and/or versions that has changed over time;

the second digital data payload generated by processing the first digital data payload based upon the first metadata is compatible with the present set of standards and/or versions; and the second digital data payload output to the computer system for use is output for use in accordance with the present set of standards and/or versions.

16. A digital data preservation system for ensuring integrity of preserved data over time comprising:

one or more processors; and one or more non-transitory computer-readable media storing computer-readable instructions configured to cause one or more processors to:

receive a first digital data payload to be preserved, wherein the first digital data payload comprises one or more first constituent data;

process the first digital data payload to be preserved to identify first metadata associated with the one or more first constituent data and adhering to a pre-defined data model;

process the first digital data payload be preserved to generate a second digital data payload representing the received first digital data payload to be preserved, wherein the second digital data payload comprises:

second metadata adhering to the pre-defined data model; and one or more second constituent data representing the one or more first constituent data;

generate, using a data integrity function, a unique identifier corresponding to the second metadata of the second digital data payload;

store, at a first point in time:

the second digital data payload for later retrieval; and the unique identifier corresponding to the second metadata of the second digital data payload;

retrieve, at a second point in time following the first point in time:

the second digital data payload; and the unique identifier corresponding to the second metadata of the second digital data payload;

generate, using the data integrity function, a new unique identifier corresponding to the second metadata retrieved from the digital data preservation system at the second point in time;

verify that the second metadata has not been tampered with and/or modified by comparing the unique identifier with the new unique identifier; and output the second digital data payload to a computer system for use.

17. The computing system of claim 16, wherein processing the second digital data payload comprises:

identifying a format preservation policy; and generating, for each of the one or more first constituent data, based upon the format preservation policy and a first file format of the first constituent data, corresponding second constituent data in a second file format different than the first file format.

18. The computing system of claim 16, wherein the first digital data payload is a Microsoft SharePoint List Record, a Microsoft Teams Message, a Microsoft SharePoint Library Record, a Microsoft Exchange Email, or a Lotus Notes Database Record.

19. The computing system of claim 16, wherein the computer-readable instructions are further configured to cause one or more processors to:

store, for at least one of the one or more second constituent data, a corresponding first unique identifier.

20. The computing system of claim 19, wherein each of the unique identifiers are stored separately from the second digital data payload.

* * * * *